(12) United States Patent
Lancuba

(10) Patent No.: US 12,050,181 B2
(45) Date of Patent: Jul. 30, 2024

(54) OPTICAL EMISSION SPECTROMETRY

(71) Applicant: THERMO FISHER SCIENTIFIC (ECUBLENS) SARL, Ecublens (CH)

(72) Inventor: Patrick Lancuba, Ecublens (CH)

(73) Assignee: Thermo Fisher Scientific (Eucblens) SARL, Eucblens (CH)

(*) Notice: Subject to any disclaimer, the term of this patent is extended or adjusted under 35 U.S.C. 154(b) by 165 days.

(21) Appl. No.: 17/780,076

(22) PCT Filed: Nov. 3, 2020

(86) PCT No.: PCT/EP2020/080821
§ 371 (c)(1),
(2) Date: May 26, 2022

(87) PCT Pub. No.: WO2021/104809
PCT Pub. Date: Jun. 3, 2021

(65) Prior Publication Data
US 2023/0008231 A1    Jan. 12, 2023

(30) Foreign Application Priority Data
Nov. 29, 2019 (GB) ...................... 1917407

(51) Int. Cl.
*G01N 21/71* (2006.01)
*G01J 3/02* (2006.01)
*G01J 3/443* (2006.01)

(52) U.S. Cl.
CPC .......... *G01N 21/718* (2013.01); *G01J 3/0208* (2013.01); *G01J 3/443* (2013.01)

(58) Field of Classification Search
CPC .. G01J 3/0208; G01J 3/443; G01N 2021/335; G01N 21/031; G01N 21/31; G01N 21/33;
(Continued)

(56) References Cited

U.S. PATENT DOCUMENTS

2005/0082482 A1    4/2005  Ludviksson
2008/0180698 A1*   7/2008  Kwak ............... G01B 11/0625
                                                356/630
(Continued)

FOREIGN PATENT DOCUMENTS

EP      1 664 691 A1    6/2006
JP      2004-522168 A   7/2004
(Continued)

OTHER PUBLICATIONS

English Translation of Notice of Reasons for Refusal issue in Japanese Patent Application No. 2022-529382 dated Jun. 15, 2023.
(Continued)

*Primary Examiner* — Hina F Ayub
(74) *Attorney, Agent, or Firm* — BakerHostetler

(57) ABSTRACT

A method for controlling the flow of gas through a spectrometer, comprising: flowing a gas through a volume of the spectrometer, the volume being a volume through which light from a sample passes along a first path to reach a first detector and the gas being transparent to the light in a spectral region analysed by the spectrometer; transmitting light from a light source along a second path through the gas to a second detector; detecting an intensity of the light from the light source at the second detector at one or more wavelengths of the light; comparing the detected intensity of the light to a respective setpoint corresponding to a desired transmittance of the gas in the volume of the spectrometer and generating at least one error signal based on the comparison; and adjusting a flow rate of the gas through the volume of the spectrometer based on the error signal, in particular to minimise the difference between the detected intensity and setpoint.

31 Claims, 8 Drawing Sheets

(58) Field of Classification Search
CPC .... G01N 21/359; G01N 21/67; G01N 21/718; G01N 2201/066
See application file for complete search history.

(56) References Cited

U.S. PATENT DOCUMENTS

| | | |
|---|---|---|
| 2012/0113426 A1 | 5/2012 | Rao |
| 2015/0177131 A1 | 6/2015 | Liu et al. |
| 2017/0102315 A1 | 4/2017 | Sawyers |
| 2017/0139182 A1 | 5/2017 | Sawyers |
| 2018/0259452 A1 | 9/2018 | Li et al. |

FOREIGN PATENT DOCUMENTS

| | | |
|---|---|---|
| JP | 2009-510486 A | 3/2009 |
| WO | 2005/024361 A1 | 3/2005 |
| WO | 2014/062419 A1 | 4/2014 |

OTHER PUBLICATIONS

Asimellis, et al., "Near-IR bromine Laser Induced Breakdown Spectroscopy detection and ambient gas effects on emission line asymmetric Stark broadening and shift", Spectrochimica Acta Part B, vol. 61, No. 12, pp. 1270-1278, 2006.

Kreuzer, "Ultralow Gas Concentration Infrared Absorption Spectroscopy", Journal of Applied Physics, vol. 42, Issue 7, pp. 2934-2943, 1971.

Ebert, et al., "In situ oxygen-monitoring using near-infrared diode lasers and wavelength modulation spectroscopy", Laser Applications to Chemical and Environmental Analysis, pp. 206-209, 1998.

White, "Long Optical Paths of Large Aperture", Journal of the Optical Society of America vol. 32, Issue 5, pp. 285-288, 1942.

Hanst, "Infrared Spectroscopy and Infrared Lasers in Air Pollution Research and Monitoring", Applied Spectroscopy, vol. 24, Issue 2, pp. 161-174, 1970.

Wilkinson, et al., "The Absorption Spectra of Methane, Carbon Dioxide, Water Vapor, and Ethylene in the Vacuum Ultraviolet", The Journal of Chemical Physics, vol. 18, Issue 2, pp. 190-193, 1950.

Ditchburn, et al., "Absorption cross-sections in the vacuum ultraviolet. I. Continuous absorption of oxygen (1800 to 1300 angstrom)", Proc. R. Soc. Lond., pp. 61-70, 1953.

Fernholz, et al., "In-situ monitoring of water vapour and gas temperature in a coal fired power-plant using Near-Infrared Diode Lasers", OSA Trends in Optics and Photonics Series (Optica Publishing Group, 2000), paper SaB4, 2000.

* cited by examiner

OPTICAL EMISSION SPECTROMETRY

CROSS-REFERENCE TO RELATED APPLICATIONS

This application is the National Stage Application of International Patent Application No. PCT/EP2020/080821 (filed Nov. 3, 2020), which claims priority to and the benefit of Great Britain Patent Application No. 1917407.7 (filed Nov. 29, 2019), the entireties of which applications are incorporated herein by reference for any and all purposes.

FIELD OF THE INVENTION

This invention relates to the field of optical emission spectrometry. In particular, the invention is concerned with improvements to the control of purge gas in an optical emission spectrometer.

BACKGROUND

Optical emission spectrometry is a well-known technique used to analyse samples. It is used to determine constituent molecules or atoms of a sample. When atoms excited to a high energy state relax to a lower energy state, or to the ground energy state, photons are emitted. The wavelength of the emitted photons correlates to the energy gap between the excited state from which the atom relaxed and the relaxation state to which they decay. Different atomic species have a distinct atomic emission spectrum, and so detection of the spectra can be used to determine constituents of a sample.

The so-called emission lines are generally in the infrared, visible and ultraviolet bands of the electromagnetic spectrum. A spectrograph can be arranged to detect radiation at different wavelengths of the electromagnetic spectrum. There is particular interest in detecting atomic emission lines within the ultraviolet region. Ultraviolet (UV) radiation is electromagnetic radiation lying between the visible and X-ray regions of the spectrum, that is generally between 380 nm and 5 nm. Vacuum ultraviolet (VUV) radiation is part of the UV region of the spectrum, less than 200 nm. To obtain information about a wide range of elements within a sample, the spectrometer must be capable of transmitting photons having wavelength below 200 nm, especially below 190 nm, from the sample to the detector, since many elements emit photons in this wavelength range when relaxing to a lower energy state. The spectroscopic analysis of VUV atomic lines for quantitative optical emission spectroscopy is of paramount importance to analyse elements such as carbon, nitrogen, sulphur and oxygen with ppm-sensitivity (i.e. trace amounts).

One problem that arises is that VUV radiation is absorbed by air, in particular by oxygen and water present in air. As a result, any spectroscopic analysis arranged to detect this VUV radiation is usually performed in a vacuum or in a non-absorbing gaseous environment. To avoid absorption of UV photons by air and to avoid wavelength shifts associated with changes in the refractive index of gases (which changes with the pressure of the gas and the gas composition), the spectrograph, and typically the sample, is purged with a substantially UV transparent gas, for example argon, which is generally more convenient and less costly than providing a vacuum environment. The spectrograph may detect radiation in other regions, e.g. infrared or visible, and, in such cases, preferably the gas is substantially transparent in these regions.

Such gases are relatively expensive because of the high purity required, and the rate of consumption of the gas makes the cost of purging the spectrograph with the gas one of the highest consumable costs for a laboratory using such spectrometers. Typically, a constant argon flow enters the spectrograph during each phase of the spectrometer's operation, including during sample analysis, to keep the concentration of gaseous contaminants at a controlled level. However, users switch the system off when it's not used, in order to contain costs associated with argon consumption. When the purge system is switched off, air leaks slowly penetrate and contaminate the spectrograph, since, typically, the spectrometer housing is not completely gas-tight. Small leaks cause air to enter from the outside and the pressure in the housing to change with time, which in turn causes the refractive index and absorption of the gas within the system to vary, resulting in a shift in wavelength of detected spectral lines. In particular, oxygen and water in air strongly absorb VUV light and, in turn, they reduce the light intensity transmission within the spectrograph, leading to less reliable quantitative analysis.

Therefore, when the device is switched back on, it is necessary to purge the spectrograph with argon at a higher flow rate to eliminate these impurities and restore optical VUV transmittance to optimum levels within as short a time as possible.

The purge typically occurs for a fixed period of time, which is generally at least long enough to ensure that, even in the worst-case scenario, all impurities are brought back below a certain threshold. The first problem arising from this approach is that regardless of the actual concentrations of impurities, a long, argon-intensive purge is applied. The second problem lies in the fact that once the purge is completed, further long periods of time are often required for the transmittance within the spectrograph to reach levels stable enough such that reliable quantitative analysis can be performed. This occurs because transmittance "overshooting" occurs as a result of the purge. That is, the level of transmittance reached within the spectrograph after the purge is so high that it is not in equilibrium with the constant leaks from the external atmosphere and the constant argon flow when the system is operating in its steady condition. Long periods of time (e.g. up to 24 or up to 48 hours) might be required to reach a steady-state condition. An example can be seen in FIG. 1, which shows a graph of the normalised intensity of an iron (Fe) 170.20 nm atomic emission line recorded immediately after purging the spectrograph with argon. After the initial high argon flow rate of the purge, the flow rate is switched to the lower constant-flow rate of argon for analysis, the intensity of the detected line continues to decrease until eventually reaching a steady state after at least 350 minutes.

In view of the foregoing, it is desirable to provide a reliable and simple method and apparatus to control the purge gas system of a spectrograph in order to optimise purge gas consumption and thereby reduce costs associated with the gas usage, and/or to more rapidly stabilise the transmittance level within the spectrograph, so that reliable quantitative elemental analysis can be performed with minimum instrument downtime. It is against this background that the present invention has been made.

SUMMARY

According to an aspect of the present invention there is provided a method according to claim 1 and an apparatus according to claim 15. A number of preferred features of the invention are set out in the dependent claims.

The invention makes use of the Beer-Lambert law and provides a method and an apparatus that measures the intensity of light transmitted through the purge gas within the spectrometer and thus the transmittance of the gas. The invention is based on the use of absorption spectroscopy to determine the transmittance of the purge gas. The measurements of transmittance can be made over time, continuously or non-continuously, and a feedback loop uses the measurements to adjust or control the gas flow. Thus, the measured transmittance is used to dynamically control, i.e. regulate, the flow of the gas through the spectrometer to purge the internal volume of the spectrometer. The invention, in particular embodiments, uses absorption spectroscopy to determine the level of absorbing contaminants in the volume of the spectrometer, such as oxygen and water, that absorb strongly in the VUV region of the spectrum. The regulation of gas flow may be achieved by control or regulation of a gas supply, for example by control or regulation of a valve that regulates gas flow into the spectrometer volume, or control or regulation of a pump that pumps the gas through the spectrometer volume. The invention advantageously enables a stable transmittance level to be achieved rapidly and typically with a reduced consumption of gas.

The method according to the invention is a method for controlling the flow of gas through a spectrometer. The spectrometer can be, for example, an optical emission spectrometer or optical absorption spectrometer.

The gas is transparent to the light from the sample in a spectral region analysed by the spectrometer. Preferably, the gas, which is used to purge the volume of the spectrometer and improve transmittance, is a substantially UV transparent gas, such as argon or helium. Nitrogen can be used but in practice seldom is since it has the disadvantage that nitrogen in the sample cannot then be analysed and nitrogen traces are often important to analyse, e.g. for high-grade quality steels. The transparent gas can be a mixture of different gases if desired, e.g. a mixture of argon and helium. The gas can be supplied from a gas supply, e.g. a pressurized bottle or reservoir. The gas can be pumped through the volume of the spectrometer by using a vacuum pump to pump the volume and supplying the gas from the supply into the pumped volume. The gas flow into the spectrometer may be controlled by a controllable valve, for example a valve that is controlled based on feedback of the measured transmittance. The system could be operated at ambient pressure or above using a gas supply that is pressurized above atmospheric pressure to supply the volume, e.g. via one or more valves to control the flow. The volume at atmospheric pressure could then be purged of residual air by the flow of purge gas from the pressurised gas supply.

The volume is a volume through which light from a sample passes along a first path to reach a first detector, which is thus designated the sample detector. The sample is typically located in a sample chamber. The volume through which the gas flows is generally contained within a housing of the spectrometer. The first detector is also typically contained within the spectrometer housing. Thus, light from the sample chamber passes along the first path to reach the first detector. The volume and housing typically contains a spectrograph for analysing the light from the sample.

The first, i.e. sample, detector is a photodetector for detecting light from the sample at one or more wavelengths, which is used to determine a composition of the sample, e.g. an elemental composition. The first or sample detector may comprise, for example, one or more photomultiplier tubes (PMT), and/or one or more CCD detectors, or other type of multi-dimensional pixel detector. The first detector may comprise an array photodetector, such as a CCD (single-linear or multi-linear CCD), which detects a plurality of spectral lines in parallel, i.e. a spectrum. The first detector may comprise one, two, or more so-called fixed detection channels for detecting specific spectral lines. One or more fixed channel detectors may be provided in addition to an array detector. Such fixed detection channels are preferably each provided by its own dedicated detector, such as a photomultiplier tube (PMT) or photodiode and positioned to detect a specific spectral line, e.g. characteristic of a particular element of interest.

The method of controlling the gas flow comprises transmitting light from a light source (not the sample) along a second path through the gas to a second detector. This arrangement of the light source and second detector is utilised to measure the transmittance of the gas. Thus, the second detector is the transmittance detector. The light source is adapted to emit light and specifically to emit one or more wavelengths of light that are absorbed by a contaminant species, e.g. oxygen or water, present in the gas. The light source typically emits light at wavelengths in a spectral region in which light from the sample is analysed by the spectrometer. The wavelengths emitted by the light source may be IR, visible or UV. Wavelengths of particular usefulness are in the VUV or near-IR (NIR) regions. Thus, in some embodiments, the light is VUV light, while in others the light is NIR light.

The VUV region is advantageous due to the strong absorption by air in this region (especially by water and oxygen) but the sources may be relatively expensive. A bandpass VUV filter is preferred for use with a VUV source to improve the signal-to-noise ratio. The NIR region is advantageous due to the high stability, relatively low cost and long lifetime of NIR light sources, however absorptions by the aforementioned gases are much weaker in this region and there is not a common absorption band for both water and oxygen in this region so that the gases cannot be measured simultaneously. The light source may be a laser, or UV or IR lamp. The light source may be a VUV laser source or an IR laser source, for example a diode laser source.

In some embodiments, the light source may be configured to emit light at a single wavelength or single (contiguous) band of wavelengths. In some other embodiments, the light source may be configured to emit light at two or more non-contiguous wavelengths or two or more non-contiguous bands of wavelengths. The light source may comprise two or more independent light sources for this purpose, e.g. two or more lasers that each emit light of a different wavelength. It may be preferred to use light sources that emit at two or more different wavelengths, where two or more gaseous species are to be detected, which do not have a common absorption band in a particular region of the spectrum. In some embodiments, the apparatus may comprise two or more light sources for transmitting light respectively along two or more second paths through the gas, and two or more second detectors for respectively detecting an intensity of light transmitted along the respective second or more paths, wherein each light source emits light at different wavelengths or each second detector detects light at different wavelengths, wherein the intensity of light is detected at two or more non-contiguous wavelengths or two or more non-contiguous bands of wavelengths.

The second detector may be any suitable type of photodetector, such as a photomultiplier tube (PMT), photodiode, or CCD. A GaP photodiode or PMT may be used for VUV detection, for example. Silicon photodiodes or a CCD may be used for NIR detection, for example.

The method comprises detecting an intensity of the light at the second (i.e. transmittance) detector at one or more wavelengths of the light and comparing the detected intensity of the light to a respective setpoint representing a desired transmittance of the gas in the volume of the spectrometer (in other words the setpoint corresponds to a desired detected intensity). At least one error signal is generated based on the comparison, typically based on the difference. For example, the error signal can be based on, typically proportional to, the difference between the detected intensity and the setpoint. The method proceeds by adjusting the flow rate of the gas through the volume of the spectrometer based on the error signal in order to minimise the error and thereby minimise the difference between the detected intensity and setpoint, preferably such that the difference between the detected intensity and setpoint (and hence the error) is below a threshold and more preferably such that the detected intensity becomes substantially equal to the setpoint. A controller, in particular an automatic controller, can be used for comparison of the detected light intensity provided by the second detector and the setpoint, generation of the error signal, and adjustment of the gas flow. The controller may generate an output signal to control the gas flow, e.g. based on the output signal a valve and/or pump may be controlled. In some embodiments, an intensity is detected for two or more wavelengths, so that there are two or more detected intensities, each for a respective wavelength. Each detected intensity is then compared to a respective setpoint and a respective error signal is generated. Thus, a plurality of error signals can be used. In a particular embodiment, two error signals are used.

The detected intensity and the set point are typically provided as representative voltages. The detector may provide the detected intensity as a voltage. The setpoint may be stored in the controller and provided from a voltage source. The detected intensity may undergo signal processing (for example, amplification etc.) before comparing to the setpoint. The automatic controller may comprise a proportional integral derivative (PID) controller. The automatic controller, preferably a PID controller, may comprise a comparator to compare the detected intensity (the process variable, PV) and the set point, SP, e.g. by comparing their voltages, and produce an error signal, which is also typically provided as a voltage. The error signal typically represents the difference between the detected and setpoint voltages. In some embodiments, the error signal can be simply the voltage difference, The automatic controller may comprise either a Single-Input, Single-Output (SISO) controller or a Multiple-Input, Single-Output (MISO) controller, which respectively convert a single error signal or multiple error signals into an output signal. The output signal is a signal used to control the gas flow, for example by controlling a power regulator that controls a flow valve and/or a pump for the gas. The output from the automatic controller typically depends on the magnitude of the one or more error signals. The output from a PID controller, for example, depends on the magnitude, duration and/or rate of change of the one or more error signals. The power regulator then regulates the flow, for example through a valve and/or by controlling a pump, to reduce overshoot and undershoot for large step changes in transmittance. The invention therefore provides an automatic control feedback loop. The automatic control feedback loop is run on regular or pre-determined time intervals to establish and maintain the transmittance of the gas at a steady-state condition. The time intervals may depend on the measured detected intensity signal, for example on the rate of change between successive measured intensity signals. In one embodiment, if the rate of change between successive measured intensity signals decreases, the time interval for running the automatic control feedback loop may stay the same or preferably decrease. In one embodiment, if the rate of change between successive measured intensity signals increases, the time interval for running the automatic control feedback loop may stay the same or preferably increase.

In some embodiments, the process for controlling the flow of gas begins once the spectrometer is switched on after a shutdown, e.g. a long-term or short-term shutdown, such that the control loop is activated once the gas purge is started (as is soon as the gas purge is started or after). In this way the gas transmittance becomes stabilized in an efficient time before reliable analysis begins. A computer can control the system such that the process for controlling the flow of gas begins once the spectrometer is switched on and gas flow starts.

In some embodiments, the second path, for measuring transmittance of the gas, is within the volume of the spectrometer. The second path may be partly or wholly within the volume of the spectrometer. In other embodiments, the second path is within a measurement cell that is in fluid communication with the volume. The second path may be partly or wholly within the measurement cell. The measurement cell may be provided in fluid communication with the volume via a closed loop fluid circuit. The closed loop fluid circuit may be pumped, for example by being in fluid communication with the same pumping system for pumping the spectrometer volume. The gas may be circulated through the fluid circuit loop, which allows a part of the gas from the volume of the spectrometer into the measurement cell and returns the gas from the measurement cell back to the volume of the spectrometer. The gas can be pumped from the volume into the measurement cell and through the closed loop fluid circuit. A gas pumping system may be provided to flow the purge gas through the purge volume, in some embodiments to cycle the purge gas through the purge volume multiple times, optionally passing through one or more gas cleaning or filtering stages on each cycle to remove contaminants, e.g. UV absorbent gases. A gas circulation loop may be provided for recycling the gas in this way. In other embodiments, the purge gas may be vented to atmosphere after purging the volume.

In some embodiments, the second path for measuring transmittance makes a single pass though the gas. In some embodiments, the second path comprises multiple passes though the gas. A laser is a preferred light source, especially in embodiments using multiple passes though the gas. A multipass measurement cell is typically provided in embodiments using multiple passes. Multiple passes are more preferred for measuring transmittance based on absorption bands having a low absorption cross section. The optical path length of the second path can be increased to 1-100 m using a multipass measurement cell.

In some embodiments, the intensity of the light from the light source can be detected at a single wavelength or a single band of wavelengths (i.e. a single contiguous set of wavelengths forming a single band). In some particularly preferred embodiments, the intensity of the light is detected at one or more absorption wavelengths of water and/or molecular oxygen. The absorption of light by these gases may be detected with ppm sensitivity. In some embodiments, it is preferred that the light is detected at a wavelength that is absorbed by two or more contaminant gases (e.g. water and oxygen), i.e. at a common absorption wavelength. In other embodiments, the intensity of the light can be detected at two or more non-contiguous wavelengths or two or more non-contiguous wavelength bands.

The purge gas may be flowed through the volume at ambient, i.e. atmospheric pressure, at elevated pressure (above atmospheric), which is preferred in order to reduce leaks into the volume, or at a reduced pressure (vacuum) by means of a vacuum pump that pumps the volume. In elevated pressure embodiments, the pressure may be between 1000 mbar and 1100 mbar. In vacuum embodiments, the pressure of the gas in the volume may be below atmospheric pressure down to about 1 mbar, for example from 1 to 500 mbar, or 1 to 100 mbar. In some embodiments, a vacuum pressure below 1 mbar may be employed, e.g. down to 0.1 mbar, or 0.01 mbar, or 0.001 mbar. The purge gas may be vented to atmosphere after flowing through the volume or it may be recirculated or returned to the volume in a gas flow circulation loop, optionally via drying and/or filtering. The flow rates may be, for example, in the range of 100 mL/min to 5,000 mL/min, although flow rates higher or lower than this range may be used.

The spectrometer can be any spectrometer, for example an optical emission or optical absorption spectrometer, in which a gas is utilised to purge a volume of the spectrometer that contains an optical path (being the whole or part of an optical path) of light from a sample that is analysed at a detector. Optical emission spectrometers that utilise a UV transparent purge gas, such as argon, are particularly suitable for the invention. Spectrometers for performing spark optical emission spectrometry (Spark-OES) or laser induced breakdown spectroscopy (LIBS) are two examples of such spectrometers. Other plasma source optical emission spectrometers (e.g. inductively coupled plasma (ICP-OES) or glow-discharge optical emission spectrometers) may be employed.

The optical emission spectrometer can be used for performing optical emission spectrometry. The optical emission spectrometer comprises a spectrograph for recording a spectrum of the emitted light that has travelled along a first path from a sample to the first detector. The spectrograph may analyse the light according to its wavelengths, for example by separating the light according its wavelengths, e.g. using one or more gratings, and detecting the separated light, or by detecting the light according to its different energies (thus wavelengths) using an energy dispersive detector as the first detector. Thus, the spectrograph may be a wavelength dispersive or energy dispersive spectrograph. The spectrograph may comprise a dispersive means such as a grating to disperse light spatially according to its wavelength. The first detector can detect the dispersed light to produce a spectrum. An intensity versus wavelength spectrum can thus be recorded by the spectrograph. The spectrum of the emitted light can enable the composition of the sample material to be deduced.

The spectrograph may comprise analysing and detecting light from a sample chamber accommodating a sample to be analysed, which can, for example, be a plasma chamber, wherein a part of the sample is excited by a plasma. The light can be emitted by excited sample material in the sample chamber. The sample can be excited to emit light by a plasma. The chamber may be a spark chamber, wherein the plasma is produced from the sample by a spark, or a chamber wherein the plasma is produced from the sample by a laser (e.g. as in LIBS). Thus, the plasma can be produced by applying a discharge (spark or arc) or a laser to the sample.

One type of optical emission spectrometry may be conducted with a plasma (e.g. inductively coupled plasma (ICP) or microwave induced plasma (MIP) or glow discharge) to excite a sample to emit light at wavelengths that are characteristic of one or more elements present in the sample.

One specific type of optical emission spectrometry may be conducted with either a spark or arc to excite a sample to emit light at wavelengths that are characteristic of one or more elements present in the sample. For convenience, as used herein, the term spark optical emission spectrometry means any optical emission spectrometry employing an electrical discharge to excite the sample such as a spark or arc for example, and the term spark chamber means a chamber for conducting any electrical discharge. In spark optical emission spectrometry, a solid sample is typically mounted onto the table of a spark stand, which forms part of the spectrometer. The spark stand further comprises a spark chamber, within which is an electrode oriented to present a tapered end towards the sample surface. The table of the spark stand has an aperture in the spark chamber wall over which the sample is mounted, usually with an air-tight seal, to face the end of the electrode. The electrode is surrounded by an insulator except for its tapered end. A sequence of electrical discharges is initiated between the electrode and the sample, in which the sample acts as a counter-electrode. The insulator promotes discharge to the sample rather than the chamber wall. Sample material local to the discharges is vaporised and a proportion of the vaporised atomic material is raised to excited states. On relaxing, the atomic material emits photons, the energies of which are characteristic of the elements in the material. Spectroscopic analysis of the emitted photons enables the composition of the sample material to be deduced. A proportion of the light emission caused by the discharges is therefore transmitted along a first path from the spark chamber to a spectrograph for spectroscopic analysis. A substantially UV transparent gas, such as argon, is flowed through the volume of the spectrometer containing the first path and the spectrograph.

The method of the present invention may be used as part of a method of optical emission spectrometry. That is, the invention provides a method of optical emission spectrometry that comprises the method for controlling the flow of gas through a spectrometer described herein.

The method of optical emission spectrometry may comprise: providing a sample (preferably a solid sample) for analysis; exciting the sample to emit light (e.g. using spark, laser or plasma); performing spectroscopic analysis of the emitted light using a spectrograph having a first detector to determine one or more elements present in the sample; wherein the emitted light passes along a first path through a volume to reach the first detector; flowing a substantially (UV) transparent gas through the volume; and controlling the flow of substantially (UV) transparent gas through the volume using the method according to the present invention. In particular, the method of optical emission spectrometry may comprise transmitting light from a light source along a second path through the gas to a second detector; detecting an intensity of the light from the light source at the second detector at one or more wavelengths of the light; comparing the detected intensity of the light to a respective setpoint corresponding to a desired transmittance of the gas in the volume and generating at least one error signal based on the comparison; and adjusting the flow rate of the gas through the volume based on the error signal.

The method of optical emission spectrometry may comprise other, well known steps of optical emission spectrometry, such as any, preferably all, of the following: providing a solid sample for analysis, typically which is mounted such that it presents a surface of the sample to the end of an electrode in the spark chamber of the optical emission spectrometer and/or typically such that it lies over an aperture in the spark chamber wall facing the end of the electrode, usually with an air-tight seal; causing one or more, typically a sequence of, electrical discharges between the electrode and the sample, in which the sample acts as a counter electrode; vaporising material from the sample and exciting at least a proportion of the vaporised material whereby the excited material emits photons, the energies (i.e. wavelengths) of which are characteristic of the elements in the material; and performing spectroscopic analysis of the emitted photons using the spectrograph to determine (i.e. identify) one or more elements present in the sample; wherein, in use, a purge gas, preferably an inert gas, e.g. argon, flows through the volume comprising the spectrograph and through which light from the sample passes along a first path to reach a detector. The volume through which the purge gas is flowed preferably contains the spectrograph, the spark chamber and any volume connecting the spectrograph and spark chamber through which the emitted light travels.

In a particular aspect, the invention provides a method of optical emission spectrometry that comprises: providing a solid sample for analysis, such that it presents a surface of the sample to the end of an electrode in a spark chamber; causing one or more electrical discharges between the electrode and the sample, in which the sample acts as a counter electrode; vaporising material from the sample and exciting at least a proportion of the vaporised material whereby the excited material emits light; and performing spectroscopic analysis of the emitted light using a spectrograph having a first detector to determine one or more elements present in the sample; wherein the emitted light passes along a first path through a volume to reach the first detector, and the method comprises flowing a substantially UV transparent gas through the volume; transmitting light from a light source along a second path through the gas to a second detector; detecting an intensity of the light from the light source at the second detector at one or more wavelengths of the light; comparing the detected intensity of the light to a respective setpoint corresponding to a desired transmittance of the gas in the volume and generating at least one error signal based on the comparison; and adjusting the flow rate of the gas through the volume based on the error signal.

The present invention provides an apparatus for controlling the flow of gas through a spectrometer, comprising: a housing containing a volume through which light from a sample can pass along a first path to reach a first detector; a gas supply for flowing a substantially UV transparent gas through the volume; a light source for transmitting light along a second path through the gas; a second detector for detecting an intensity of light from the light source transmitted along the second path through the gas at one or more wavelengths of the light; and a controller for comparing the detected intensity of the light to a respective setpoint corresponding to a desired transmittance of the gas in the volume, generating at least one error signal based on the comparison (i.e. based on the difference between the detected intensity and the setpoint), and adjusting a flow rate of the gas through the volume of the spectrometer based on the error signal. The present invention provides an optical emission spectrometer comprising the apparatus for controlling the flow of gas.

LIST OF FIGURES

DETAILED DESCRIPTION

In order to further understand features of the invention, various embodiments are now described, which are examples only.

The invention makes use of the Beer-Lambert law, which states that the measured transmittance of light through an absorbing gas decays exponentially as a function of the product between the gas concentration (c), the optical path length (d) and the absorption cross section ($\sigma$), the latter being an intrinsic property of the gaseous species.

Figure 1:
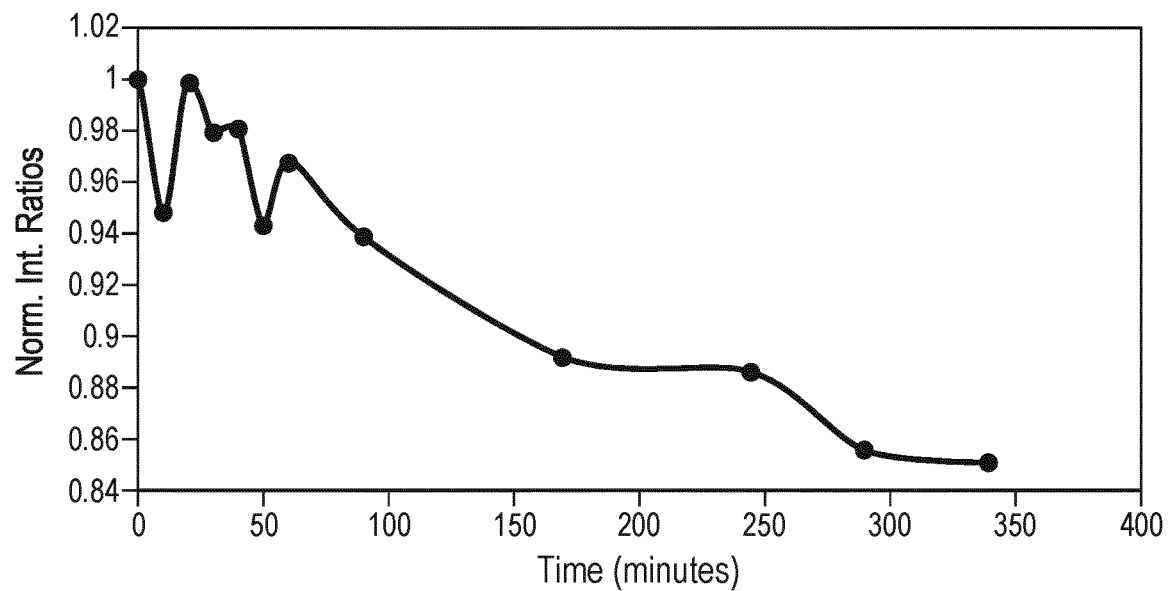
FIG. 1 shows a graph of the normalised intensity of an iron (Fe) 170.20 nm atomic emission line recorded after purging the spectrograph with argon.
Figure 2A:
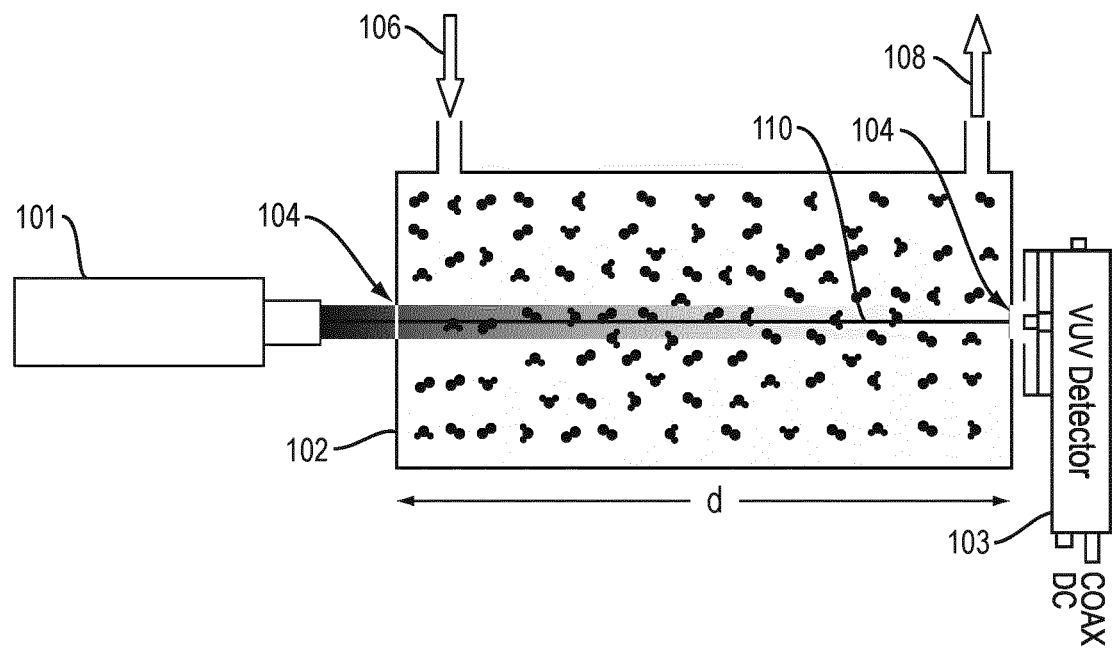
FIG. 2 shows schematically an assembly for a single pass absorption measurement that may be utilised in embodiments of the present invention.
Figure 2B:
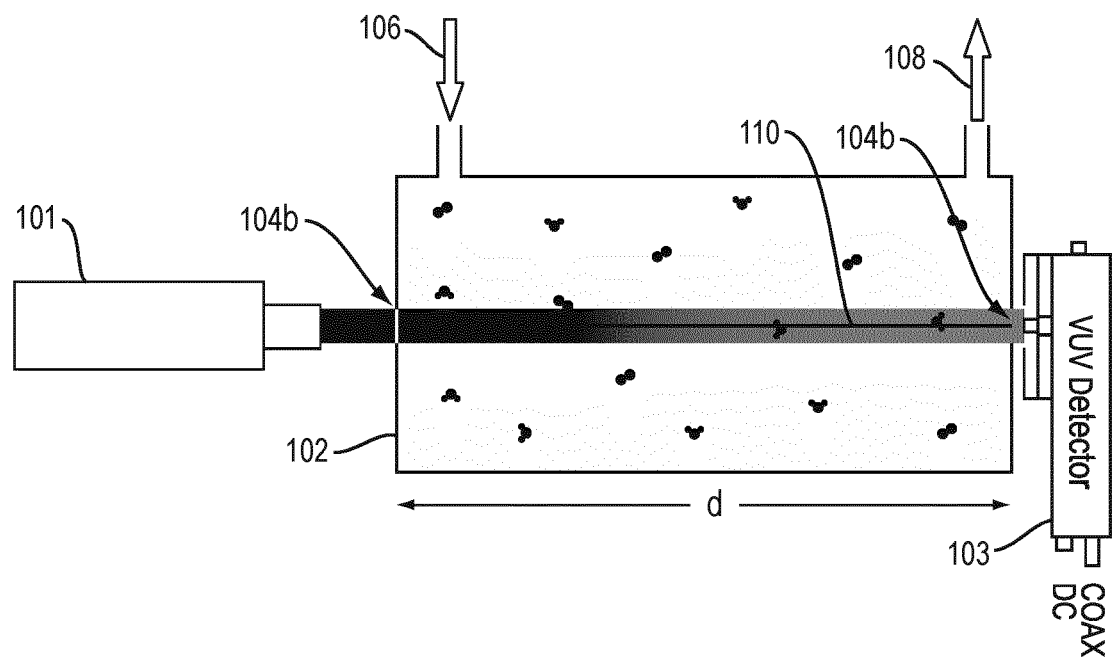

One embodiment of the invention is based on a single pass absorption measurement as shown schematically in FIG. 2. A UV transparent purge gas is flowed through a volume of a spectrometer (not shown) containing the path of light from a sample to a detector. The volume is purged with the gas in order to improve the transmittance inside the spectrometer and thereby the stability and sensitivity of the sample analysis. The upper graphic (a) shows a measurement cell 102 filled with flowing purge gas from the spectrometer, eg. argon gas, having a relatively high concentration of contaminants in the form of absorbing gaseous species (for example, oxygen ($O_2$) and water ($H_2O$)). The contaminants may be present in the purge gas due to leaks in the purge volume of the spectrometer and may build-up when the spectrometer purge system has been switched off for some time. The lower graphic (b) shows a measurement cell 102 filled with the gas, eg. argon, having a relatively low concentration of the contaminant absorbing gaseous species (for example, oxygen ($O_2$) and water ($H_2O$)).

In some embodiments of the invention, the measurement cell 102 is in fluid communication with an internal volume of a spectrometer (not shown), such as an optical emission spectrometer, that is purged with the gas in order to improve the transmittance inside the spectrometer. The volume of the spectrometer that is purged with the gas is a volume through which light from a sample passes along a first path to reach a first detector (not shown) and which preferably contains a spectrograph comprising the first detector to analyse the light. The gas from the spectrometer, which may be termed herein the purge gas, is in fluid communication with the measurement cell and enters the measurement cell though inlet 106 and exits the cell through outlet 108, for example to return to the spectrometer. The gas is thus in fluid communication with the volume of the spectrometer via a closed loop fluid circuit. The gas in some embodiments may be pumped from the volume into the measurement cell and through the closed loop fluid circuit.

A vacuum ultraviolet (VUV) light source 101 in the shown embodiment is arranged at one end of the measurement cell 102 to pass VUV light through the cell by using suitable VUV-transparent, low reflectivity windows 104. The light source 101 can be, for example, a deuterium lamp or a xenon flash lamp. The windows 104 are provided on either ends of the cell. The measurement cell can be a separate cell as in this embodiment or can be part of the spectrometer itself, e.g. within the volume of the spectrometer. In the latter case, the analysis of the transmittance of the gas is carried out directly inside the spectrometer. In the former case shown in FIG. 2, the pump allows gas from inside the spectrometer to enter into the separate gas measurement cell 102 through inlet 106 and exit through outlet 108 in a closed loop circuit, where the analysis is carried out. The light from the source 101 is passed through the gas in the measurement cell along a second path 110 and detected using a second detector in the form of VUV sensitive detection system 103, such as a GaP photodiode or a photomultiplier tube (PMT). The cell has a path length, d. The path length, d, for a single pass can be 5-30 cm in some embodiments where the cell is integrated within the spectrometer. The path length, d, for a single pass can be 10-50 cm in some embodiments where the cell is located outside the spectrometer. The intensity of the received light, which depends on the concentration of the absorbing gas species water and oxygen, can be detected by the detection system 103. The detected intensity will be higher (due to higher transmittance of the gas) in the case of the lower concentration of the absorbing gases, as shown in graphic (b) of FIG. 2, compared to the higher concentration of the absorbing gases, as shown in graphic (a) of FIG. 2. The absorbing gases such as water and oxygen are derived from the air external to the spectrometer due to leaks in the system. A too high detected amount of water and oxygen (as seen from a lower detected light intensity) indicates that the flow of the UV transparent purge gas into the spectrometer should be increased. A too low detected amount of water and oxygen (as seen from a higher detected light intensity) indicates that an overshoot of the transmittance of the gas has occurred and the flow of the UV transparent purge gas into the spectrometer should be decreased. The gas flow can thereby be dynamically adjusted based on the detected light intensity and a steady state of gas flow into the spectrometer volume can thereby be achieved efficiently, in a short time and with minimal gas consumption. Further details on the control of the gas flow based on the detected transmittance of the gas are described below.

The advantages of using VUV light are: a) the ability to measure both water and oxygen gases simultaneously, by taking advantage of common electronic transitions between wavelengths of 130 and 190 nm); b) the strong molecular absorption cross section ($10^{-19}$ $cm^{-1}$ $mol^{-1}$ $cm^3$) of these two gases within this wavelength range, and c) the ability to perform measurements with strong sensitivity within compact, single pass absorption cells. Some disadvantages exist in that VUV light sources tend to be relatively expensive, and a bandpass VUV filter is usually needed to achieve good signal-to-noise ratio.

Figure 3:
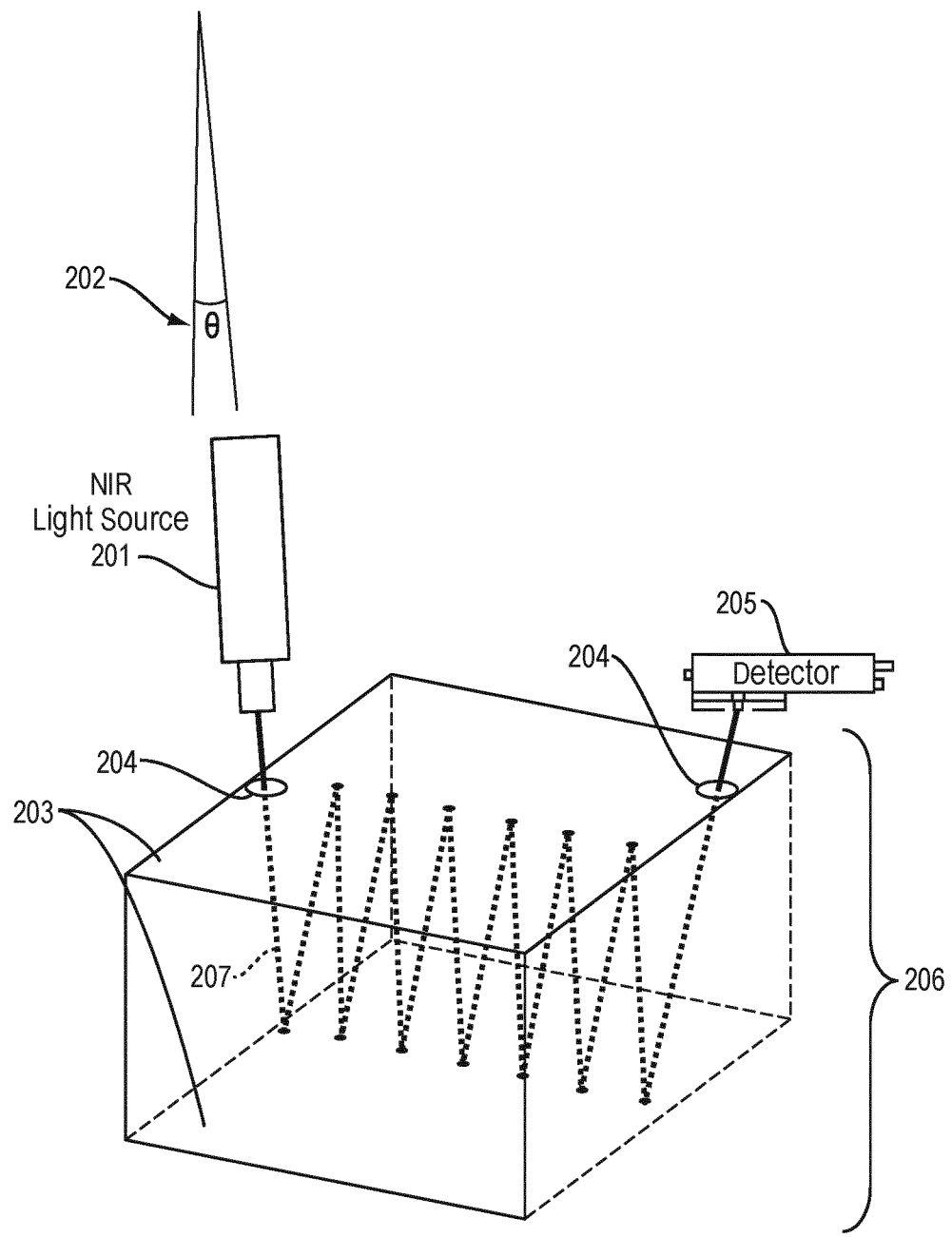
FIG. 3 shows schematically an assembly for a multipass absorption measurement that may be utilised in embodiments of the present invention.

Another embodiment of the invention is based on a multipass absorption measurement as shown schematically in FIG. 3. Other than the features related to the multipass configuration, the other features and principles are the same as described for the single pass system shown in FIG. 2, for example as regards the inlet and outlet of the gas etc.

The embodiment shown in FIG. 3 uses a near infrared (NIR) light source 201, such as a laser diode, to perform the detection of gaseous water or oxygen in the NIR part of the electromagnetic spectrum (wavelengths between 760-950 nm). Laser wavelengths in the NIR can include 830 nm and 940 nm for absorption by water and 760 nm for absorption by oxygen. The principle of the multipass measurement once again relies on the Beer-Lambert law, as applied to the single pass measurement embodiment shown in FIG. 2. However, the strong molecular absorption cross section of either water or oxygen in the NIR region is 2-4 orders of magnitude lower ($10^{-23}$-$10^{-21}$ $cm^{-1}$ $mol^{-1}$ $cm^2$) than in the VUV region. Thus, a longer optical path length is needed in order to achieve high enough sensitivity to perform the measurement with ppm accuracy.

In the embodiment shown in FIG. 3, a NIR light beam 207 is passed from a NIR light source 201 through a gas measurement cell 206 containing the purge gas in order to measure the transmittance of the gas, the light beam entering and leaving the cell via NIR-transparent, low reflectivity windows 204. The increased sensitivity is achieved by increasing the optical path length of the light beam through the cell by 2-4 orders of magnitude (compared to a single pass) by using highly reflective NIR mirrors 203 placed at opposite ends of the cell so that the light is reflected between the mirrors multiple times. The NIR-transparent windows 204 are positioned within the mirrors 203. In the shown embodiment, the windows 204 are positioned within the same mirror but in other embodiments they could be positioned in opposite mirrors. The back and forth path of the light beam through the cell (the second path according to the invention) is shown by the dotted line 207. By adjusting the incoming or incident angle θ (202) of the beam 207 to the surface of the mirrors 203, the number of reflections can rapidly increase, allowing compact gas cells (e.g. 1-10 $dm^3$) with 1-100 m optical path lengths to be engineered. Typical incident angles θ are 1°-10°. After multiple reflections, the light beam exits the cell and is received by a NIR sensitive detector 205 (e.g. a charge-coupled device (CCD) or a silicon photodiode), which is the second detector according to the invention. The advantages of the NIR multipass method lie include a) high stability and long lifetime of NIR light sources, and b) low upfront and maintenance costs. A disadvantage of this method lies in the fact that oxygen and water cannot be detected simultaneously, as no common absorption bands exist for the two gases in the infrared region of the electromagnetic spectrum. To address the latter, it is possible to obtain information about the transmittance of the gas by measuring only one of these gases, preferably only gaseous water as it requires a longer time than oxygen to be eliminated from a closed container because of the ability of water to stick to surfaces by hydrogen bonding. Alternatively, it is possible to measure gaseous water and gaseous oxygen using two independent measuring systems (e.g. two independent multipass systems). Each independent measuring system comprises its own light source, beam path and second detector.

Figure 4:
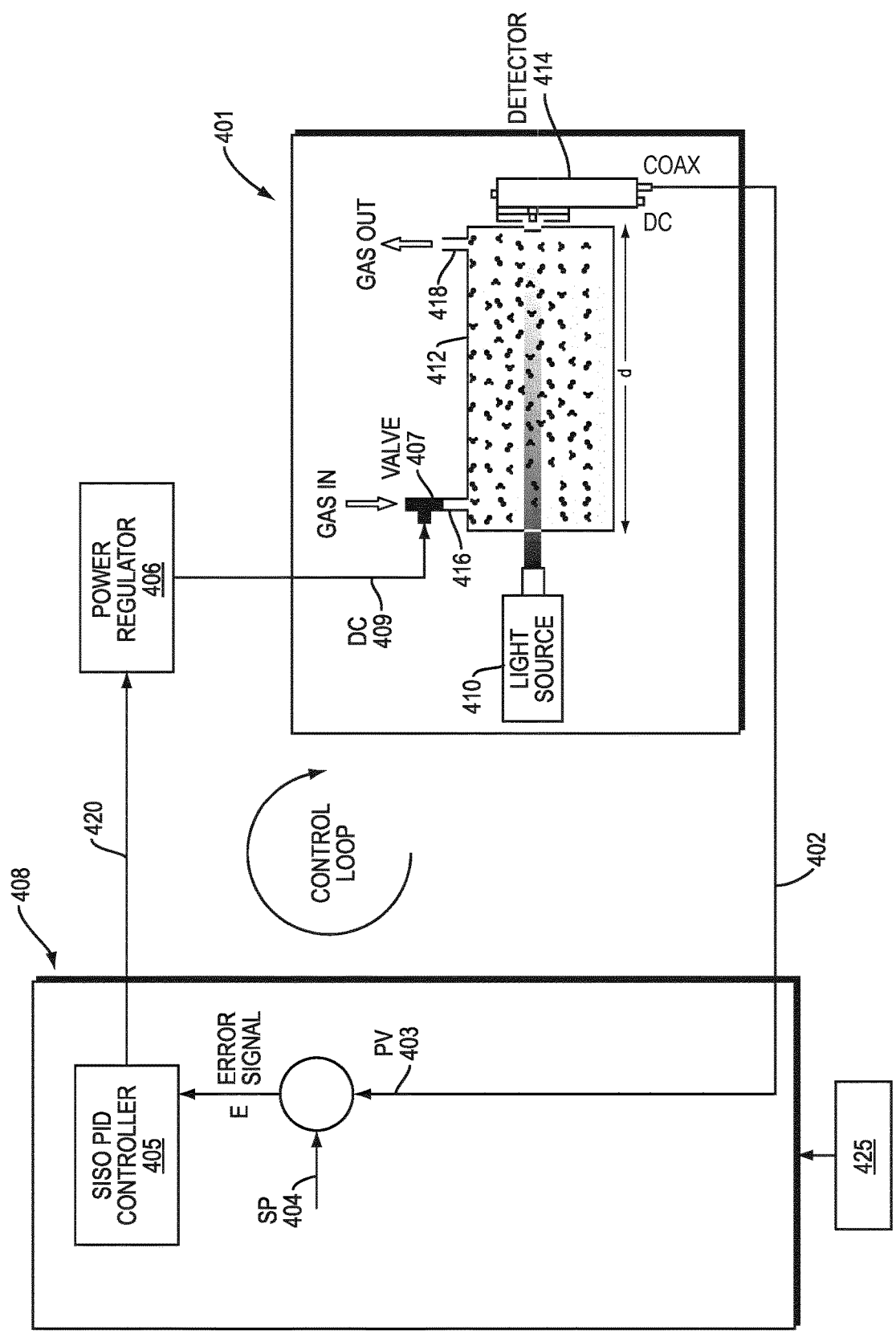
FIG. 4 shows schematically an embodiment of a control loop system for controlling gas flow through a spectrometer volume based on feedback of the detected intensity of light transmitted through the gas, in which a single pass absorption measurement is used.

An embodiment of a control loop system for controlling the gas flow through the spectrometer volume based on feedback of the detected intensity of the transmitted light through the gas (transmittance of the gas) is shown schematically in FIG. 4. The system comprises an automatic control loop based on proportional integral derivative (PID) control. A measurement system 401 is shown, which comprises a light source 410 that transmits light along a path through a UV transparent gas present in a measurement container 412 to be collected at a detector 414. Gas enters the container 412 through inlet 416 and exits through outlet 418. A pump (not shown), which can be fluidly connected to the outlet, draws gas though the container or circulates the gas through the container in a closed loop. During operation, the typical gas pressure in the container is above, preferably just above, atmospheric pressure (e.g. 1100 mbar) in order to minimise leaks into the container. A variable valve 407 controls the gas flow entering the container. The container 412 itself can be the volume of a spectrometer through which light from a sample passes along a first path to reach a first detector for analysis of the light from the sample, which volume is purged by the UV transparent gas. In alternative embodiments, the container 412 can be a separate measurement cell that is in fluid communication with the spectrometer volume.

The detector 414 of the measurement system produces a detector signal 402 based on the detected light intensity that represents the measured transmittance of the gas. The detector signal 402 is fed to an automatic controller 408 comprising a PID controller. The signal 402 is typically a potential voltage that is the process variable (PV) input 403 to the PID control of the automatic controller 408. The input value 403 is compared on-demand with a pre-defined setpoint (SP) 404 corresponding to a desired or predetermined concentration of absorbing contaminant gases, for example water and oxygen. The setpoint is stored in the controller 408 and provided as a voltage from a voltage source (not shown). From this comparison, an error signal (E) is given as an output. A Single-Input, Single-Output (SISO) PID controller 405 reads the error signal and outputs a reference value or signal 420 to a power regulator 406, such that the reference value or signal 420 depends on the magnitude, duration and rate of change of the error signal, i.e. it is a correction based on proportional, integral, and derivative terms. The power regulator 406 then outputs a signal, in this case a DC current 409, on the basis of the reference value from the PID controller in order to control, i.e. adjust, the valve 407 and thereby regulate the gas flow through the valve. If the error signal is large, e.g. based on a large difference between the detected light intensity value 403 and the setpoint 404 due to a too low transmittance (purge undershoot) or too high transmittance (purge overshoot) of the gas, then the reference value 420 to control the power regulator output 409 to the valve 407 is adjusted to adjust the gas flow rate and reduce the difference between the detected light intensity and the setpoint as quickly as possible. As the error signal becomes reduced, i.e. based on a reduced difference between the detected light intensity value 403 and the setpoint 404, then the reference value 420 to control the power regulator output 409 to the valve 407 changed accordingly to further reduce the difference between the detected light intensity and the setpoint whilst avoiding or limiting overshoot or undershoot of the gas transmittance compared to the setpoint. In this way, the system reduces overshoot and undershoot of the gas purge for large step changes in transmittance. Once the error signal becomes substantially zero, the control loop system continues to operate to maintain a steady-state gas transmittance. The automatic control loop system is run at pre-determined time intervals (sampling intervals) or continuously, e.g. regular sampling intervals or sampling intervals that depend on the last reference value or error signal, to reach and maintain the transmittance of the gas in the volume of the container at a steady-state condition. The automatic PID controller thus ensures that no significant difference (error signal stays substantially zero) continues to be measured between the detected signal voltage and setpoint voltage. In some embodiments, the control loop system can be controlled by a processor or computer 425 that can execute a computer program containing instructions causing the control loop system to carry out the method according to the invention. The computer program may be stored on a computer-readable medium. In some embodiments, the computer can control the system such that when the spectrometer is switched on after a shutdown, e.g. a long-term or short-term shutdown, the control loop (light source, detector, automatic controller, power regulator) is activated once the gas purge is started (as soon as the gas purge is started or after). In this way the gas transmittance becomes stabilized in an efficient time before reliable analysis begins.

For embodiments using a NIR light source to measure transmittance of the gas, absorptions by the aforementioned absorbing gases water and oxygen are much weaker in this region and there is not a common absorption band for both water and oxygen in this region so that the gases cannot be measured simultaneously using a single light source such as a single laser. One embodiment uses a measurement of absorption by only one of the absorbing gas species from the air contamination to obtain feedback on the transmittance, i.e. purity, of the purge gas in the spectrometer volume. When measuring only one of the absorbing gas species, it is preferred to measure gaseous water only, as it requires longer time than oxygen to be eliminated from a closed container because of the ability of water to stick to surfaces by hydrogen bonding. Of course, if necessary, it would be possible to measure oxygen only. Where only a single gas species is measured, the same principle as shown in FIG. 4 can be used for gas flow control by using a control loop system. If a NIR light source is used, due to weaker absorptions in this region, it is preferable to use a multipass measurement to measure light transmittance through the gas, as shown in FIG. 3, but a control system the same as shown in FIG. 4 can be used for the gas flow control.

Figure 5:
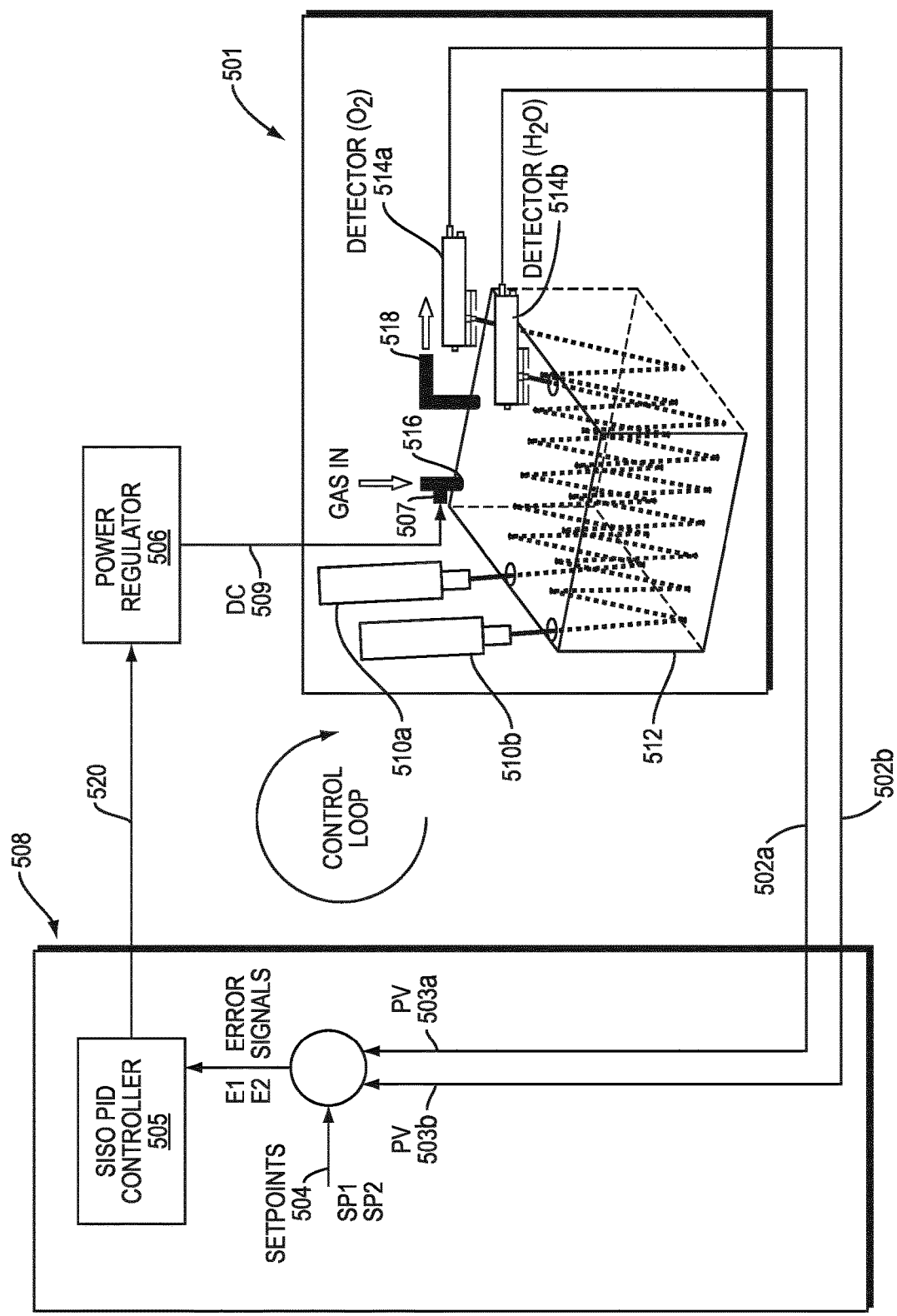
FIG. 5 shows schematically another embodiment of a control loop system for controlling gas flow through a spectrometer volume based on feedback of the detected intensity of light transmitted through the gas, in which a multipass measurement is used with two light sources to monitor the intensity of light transmitted through the gas at two separate wavelengths.

Another embodiment using a NIR light source to measure transmittance of the argon purge gas uses separate measurements of absorption by two or more absorbing gas species from air contamination (e.g. water and oxygen) to obtain feedback on the transmittance, i.e. purity, of the purge gas in the spectrometer volume. Since there is no common absorption band for these absorbing gas species in the NIR region, two (or more) separate light sources are used. FIG. 5 shows schematically an embodiment of a control loop system for controlling gas flow through a spectrometer volume based on feedback of the detected intensity of light transmitted through the gas, in which a multipass measurement similar to that shown in FIG. 3 is used with two light sources to monitor the intensity of light transmitted through the gas at two separate wavelengths. A measurement system 501 is shown, which comprises a NIR light source having two separate NIR laser light sources 510a and 510b that each transmit light of a different wavelength along a respective multiply-reflected path through the UV transparent gas (argon) present in a multipass measurement container 512 to be collected at respective light detectors 514a and 514b. One wavelength matches an absorption band of water and the other matches an absorption band of oxygen, $O_2$.

The argon gas from a gas supply (not shown) enters the container 512 through inlet 516 and exits through outlet 518. A vacuum pump (not shown) connected to the volume of the container causes the gas to flow through the container from the supply. A variable valve 507 controls the gas flow entering the container. The container 512 itself can be the volume of a spectrometer which volume is purged by the UV transparent gas and in which light from a sample passes along a first path to reach a first detector for analysis of the light from the sample. In alternative embodiments, the container 512 can be a separate measurement cell that is in fluid communication with the spectrometer volume.

Using this system, the detected light intensities from each light source are measured at the respective detectors, which represent the transmittances for each of the absorbing gaseous species, water and oxygen. A potential voltage (503$a$ and 503$b$, respectively for the water and the oxygen measurement) is output from each of the detectors for each detected light intensity and is fed as an input to the automatic controller 508. The controller compares these input voltage values on-demand with respective pre-defined setpoints SP1 and SP2 (504) corresponding to the desired gases concentration and from this comparison error signals are given as outputs. A Multiple-Input, Single-Output (MISO) PI D controller (505) reads these error signals (E1 and E2) and, depending on pre-defined settings of the PID controller 505, generates the output strategies (broadly divided into cooperative and non-cooperative). In a cooperative strategy, each detector is given a weight and the PID response depends on the weighted average of these two sensors. For example, oxygen is typically much faster to eliminate from the system than water and if, say, it is 10 times faster the oxygen detector can have 1/10 of the total weight compared to the water detector when determining how the PID control should react to receiving both detector measurements. In a non-cooperative system, it is assumed that one system is dominant over the other. In the example, the PID will act only on the gas with the largest concentration and the PID will operate based on that single gas only. Both gases nevertheless need to be monitored in case the system that is dominant switches. In that case, the PID response also switches to the gas that at a given point in time possesses the largest concentration. The PID controller 505 in turn outputs a reference value 520 for the power regulator 506 depending on the magnitude, duration and rate of change of the error signals. The power regulator then outputs a DC current that regulates the flow through a valve 507 to reduce overshoot and undershoot for large step changes in transmittance and reach a steady state transmittance for the gas in a minimal time and with minimal purge gas consumption, as described above. The automatic control loop system is run on pre-determined time intervals to reach and maintain the steady-state conditions.

Figure 6:
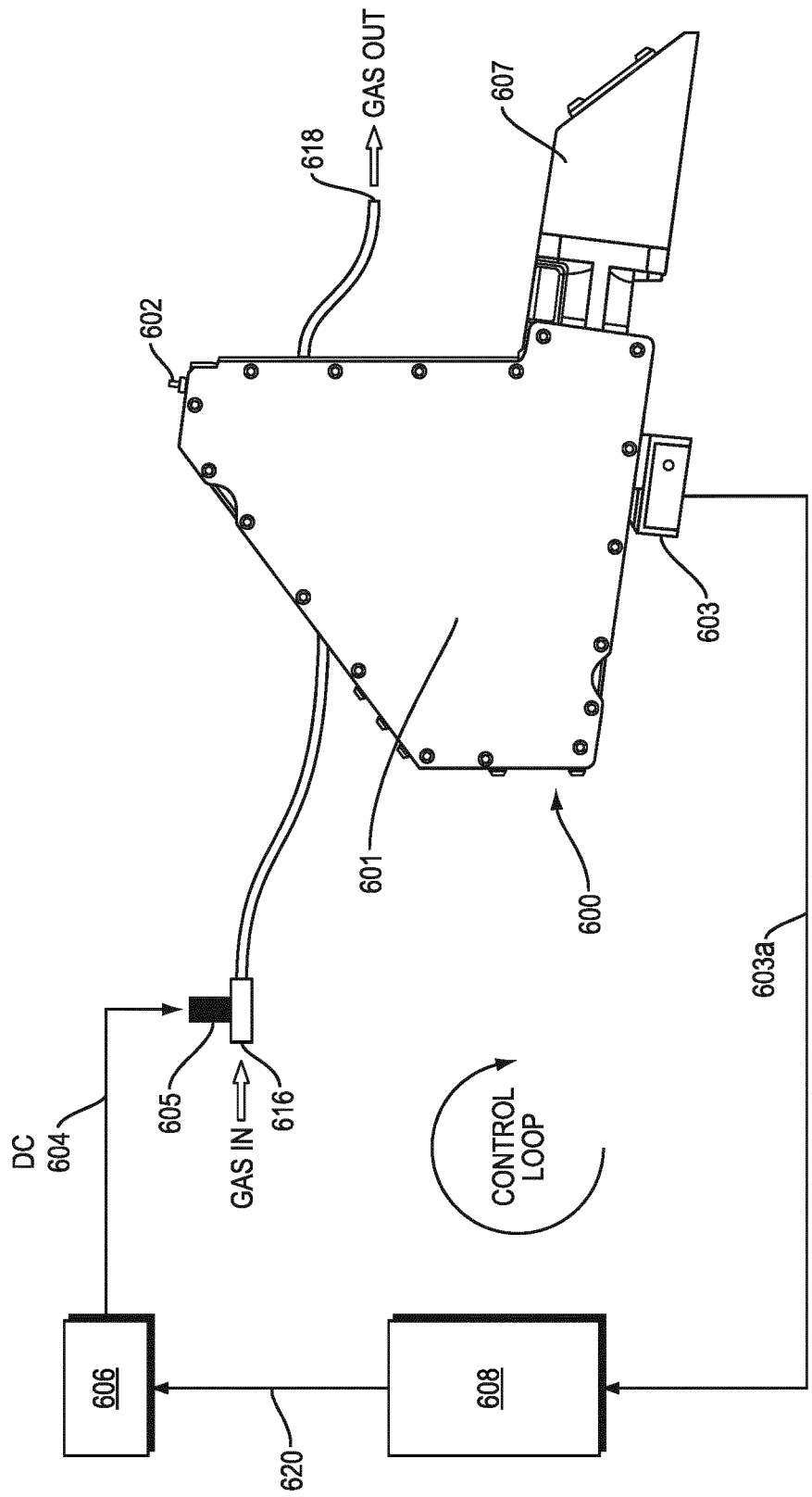
FIG. 6 shows schematically an embodiment of a spark optical emission spectrometer comprising an apparatus for controlling the flow of a purge gas through the spectrometer that utilises a single pass absorption measurement.

Referring to FIG. 6, there is shown schematically a configuration of a spark optical emission spectrometer 600 comprising an apparatus for controlling the flow of a UV transparent purge gas through the spectrometer. The spectrometer comprises a spectrograph 601, which comprises optics, gratings and a detection system (not shown) for analysing light emitted from sample material that has been vaporised and excited by applying a spark discharge to a solid sample in a spark chamber 607. The spectrograph 601 is purged of air by flushing the volume inside the spectrograph with argon. The argon from a pressurised supply (not shown) enters the volume through gas inlet 616, and the flow rate through the inlet is controlled by adjustable valve 605. A vacuum pump (not shown) is connected to gas outlet 618 to maintain a pressure in the spectrometer between atmospheric pressure and about 1100 mbar, so as to minimise leaks during the purge.

A UV light source 602, such as a laser, is located outside the spectrograph and provides a light beam through a UV transparent window into the spectrograph volume. A detector 603 located outside the spectrograph opposite the light source receives the transmitted light through another UV transparent window. A control loop system is provided for controlling the gas flow through the volume of the spectrograph based on feedback of the detected intensity of the transmitted light (transmittance of the gas). The detected light intensity measured at the detector 603, which represents the level of transmittance for the absorbing gases species water and oxygen, is used to generate a voltage (603$a$) that is fed to the automatic PID controller 608. The controller 608 compares the input voltage with a setpoint corresponding to the desired gas transmittance (gas concentration) and from this comparison an error signal is generated from which, in turn, the PID controller generates an output reference signal 620 for the power regulator 606 depending on the magnitude, duration and/or rate of change of the error signal. On the basis of the reference signal, the power regulator 606 then outputs a DC current that controls the valve 605 so as to reduce overshoot and undershoot of the argon flow and reach a steady state transmittance for the gas in the spectrograph in a minimal time and with minimal argon gas consumption.

Figure 7:
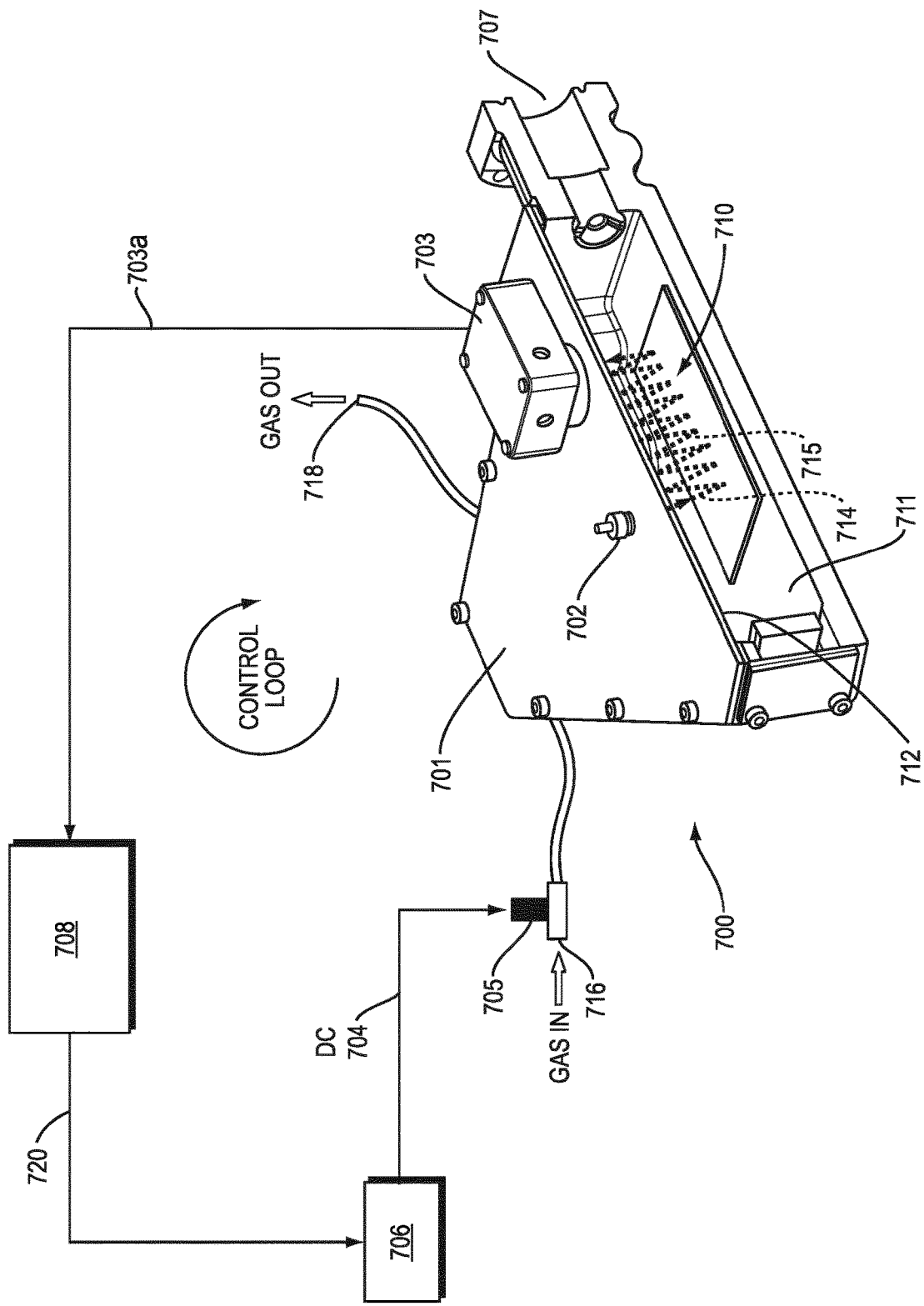
FIG. 7 shows schematically an embodiment of a spark optical emission spectrometer comprising an apparatus for controlling the flow of a purge gas through the spectrometer that utilises a multipass absorption measurement.

FIG. 7 shows schematically an embodiment of a spark optical emission spectrometer 700 comprising an apparatus for controlling the flow of a purge gas through the spectrometer that utilises a multipass absorption measurement. The Figure shows a part cut-away view of the spectrometer allowing a view of the internal volume and light beam path.

Many components of the spectrometer are common to the spectrometer 600 shown in FIG. 6. The apparatus is again for controlling the flow of a UV transparent purge gas through the spectrometer. The spectrometer comprises a spectrograph 701, which comprises optics, gratings and a detection system (not shown) for analysing light emitted from sample material that has been vaporised and excited by applying a spark discharge to a solid sample in a spark chamber (not shown) that is received into the spectrograph 701 through aperture 707.

The spectrograph 701 is purged of air by flushing the volume inside the spectrograph with argon. The argon from a pressurised supply (not shown) enters the volume through gas inlet 716, and the flow rate through the inlet is controlled by adjustable valve 705. A vacuum pump (not shown) is connected to gas outlet 718 to produce a pressure of argon in the volume of the spectrograph (between 1100 mbar and atmosphere) thereby removing most of the air. The argon gas flows into the volume during purging to flush the volume of air. The argon leaves the volume through the outlet 718.

A UV light source 702, such as a laser, is located outside the spectrograph and provides a light beam 714 through a UV transparent window (not shown) into the spectrograph volume. A detector 703 is also located outside the spectrograph and, in this example, is on the same side of the spectrograph as the light source. The detector 703 receives the transmitted light from the spectrograph through another UV transparent window (not shown). This embodiment differs from that shown in FIG. 6 in that the light path within the volume of the spectrometer comprises multiple passes 715 though the gas by virtue of being repeatedly reflected between reflective elements 710, e.g. highly reflective surfaces or mirrors. The first reflective element 710 is mounted on one internal side 711 of the spectrograph and is visible in the cut-away Figure and the second reflective element (not shown) is mounted opposite the first on the opposite internal side 712 of the spectrograph. The light path 715 in this embodiment thus follows a zigzag.

A control loop system is provided for controlling the gas flow through the volume of the spectrograph based on feedback of the detected intensity of the transmitted light (transmittance of the gas). The detected light intensity measured at the detector 703, which represents the level of transmittance for the absorbing gases species water and oxygen, is used to generate a voltage (703a) that is fed to the automatic PID controller 708. The controller 708 compares the input voltage with a setpoint corresponding to the desired gas transmittance (gas concentration) and from this comparison an error signal is generated from which, in turn, the PID controller generates an output reference signal 720 for the power regulator 706 depending on the magnitude, duration and/or rate of change of the error signal. On the basis of the reference signal, the power regulator 706 then outputs a DC current 704 that controls the valve 705 so as to reduce overshoot and undershoot of the argon flow and reach a steady state transmittance for the gas in the spectrograph in a minimal time and with minimal argon gas consumption.

It will be appreciated that, other mechanisms for control of the gas flow can be used in the control loop other than proportional integral derivative (PID) control. A simple comparator could be used to compare detected light intensity (representing gas transmittance) with a set point value and change the output reference value for control of a gas supply flow valve or pump based on the magnitude of the difference between measured light intensity and the setpoint.

It will be appreciated that, whilst the foregoing embodiments may be considered preferred, different configurations can be used. For example, any of the mentioned light sources (UV, VUV, visible, IR or NIR) can be used with either a single or multipass measurement.

Figure 8:
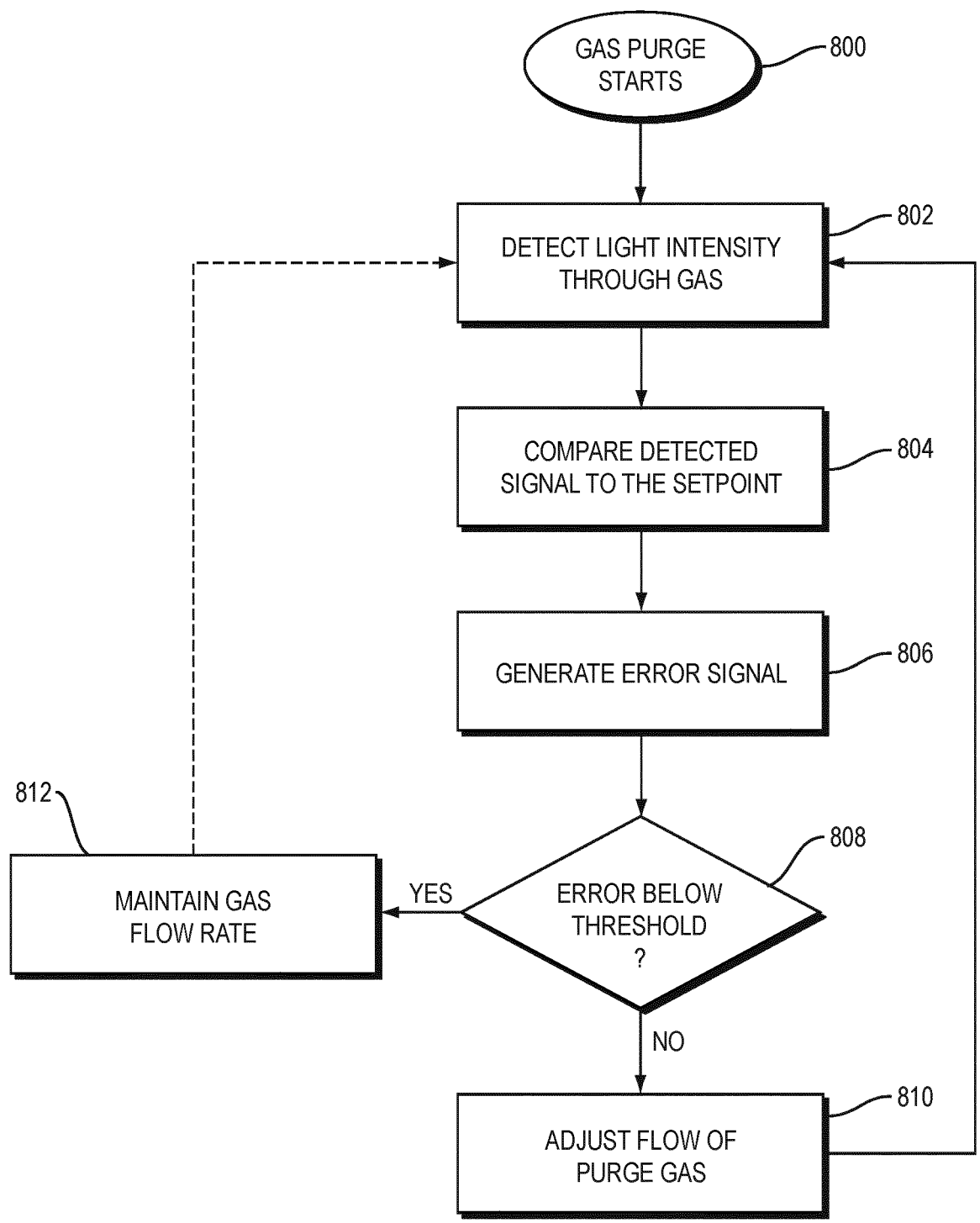
FIG. 8 shows a flow diagram of a methodology according to an embodiment of the invention.

In view of the above described embodiments, a methodology according to the invention is summarised in the flow diagram shown in FIG. 8. At step 800, the process begins with the start-up of the purge gas flow through the spectrometer. At step 802, the light source is activated to transmit light through the gas to the detector and the light intensity at the detector is detected. At step 804, the detected light intensity signal is compared by the controller to the setpoint corresponding to the desired light transmittance of the gas. At step 806, an error signal is generated based on the difference between the detected signal and the setpoint. At step 808, the controller determines if the error is below or above a predetermined threshold error. The threshold represents a minimal difference or zero difference between detected signal and the setpoint. If the error is above the threshold, then the controller adjusts the flow of purge gas at step 810 and the process begins again at step 802. If the comparison of detected light signal and setpoint indicates that the detected signal is too low (transmittance of the gas is too low), the gas flow can be increased. Likewise, if the comparison indicates that the detected signal is too high (transmittance of the gas is too high), the gas flow can be decreased. In preferred embodiments, the adjustment is made using PID control such that it is based on proportional, integral, and derivative terms. The process is performed iteratively to minimise the error until it is determined at step 808 that the error is no longer above the threshold, whereupon the flow rate is not adjusted but maintained at step 812. Thereafter, as indicated by the dashed line, the process is performed at intervals to ensure that the error signal is still not above the threshold. If the error rises above the threshold at any point, then the controller adjusts the flow of purge gas at step 810 and so on.

From the above description, the following preferred features can be recognised, which are not-exhaustive.

Preferably, adjusting the flow rate of the gas through the volume of the spectrometer minimises the difference between the detected intensity and setpoint.

Preferably, the spectrometer is an optical emission spectrometer. Preferably, the spectrometer is a spark optical emission spectrometer or a LIBS spectrometer.

Preferably, the second path is within the volume of the spectrometer.

Preferably, the second path is within a measurement cell that is in fluid communication with the volume. Preferably, the measurement cell is in fluid communication with the volume via a closed loop fluid circuit. Preferably, the gas is pumped from the volume into the measurement cell and through the closed loop fluid circuit.

In some embodiments, the second path is a single pass though the gas. In some other embodiments, the second path comprises multiple passes though the gas.

In some embodiments, preferably the light is VUV light. In some other embodiments, preferably the light is near-IR (NIR) light.

In some embodiments, preferably the intensity of the light is detected at a single wavelength or single band of wavelengths. In some other embodiments, preferably the intensity of the light is detected at two or more non-contiguous wavelengths or two or more non-contiguous bands of wavelengths. In such embodiments, preferably the light source comprises two or more discrete light sources for transmitting light respectively along two or more second paths through the gas, and two or more second detectors for respectively detecting an intensity of light transmitted along the respective second or more paths, wherein each light source emits light at different wavelengths and/or each second detector detects light at different wavelengths, wherein the intensity of light is detected at two or more non-contiguous wavelengths or two or more non-contiguous bands of wavelengths. Preferably, the different wavelengths correspond to absorptions of gaseous water and gaseous oxygen respectively. Thus, preferably, such embodiments can measure gaseous water and gaseous oxygen using two independent measuring systems (e.g. two independent multipass systems), wherein each independent measuring system comprises its own light source, second beam path and second detector.

Preferably, the intensity of the light is detected at one or more absorption wavelengths of water and/or molecular oxygen.

In some embodiments, preferably the steps of comparing the detected intensity of the light to a setpoint corresponding, generating at least one error signal, and adjusting a flow rate of the gas are performed using proportional integral derivative (PID) control. Preferably, the control is performed by a controller comprising a proportional integral derivative (PID) controller. Preferably, the controller comprises a Single-Input Single-Output (SISO) controller or a Multiple-Input Single-Output (MISO) controller, which respectively converts a single error signal or multiple error signals into an output signal that is used to control the gas flow. Preferably, the output signal controls a flow valve and/or a pump for the gas.

It will be appreciated that variations to the foregoing embodiments of the invention can be made while still falling within the scope of the invention.

The use of any and all examples, or exemplary language ("for instance", "such as", "for example" and like language) provided herein, is intended merely to better illustrate the invention and does not indicate a limitation on the scope of the invention unless otherwise claimed. No language in the specification should be construed as indicating any non-claimed element as essential to the practice of the invention.

As used herein, including in the claims, unless the context indicates otherwise, singular forms of the terms herein are to be construed as including the plural form and vice versa. For instance, unless the context indicates otherwise, a singular reference herein including in the claims, such as "a" or "an" means "one or more".

Throughout the description and claims of this specification, the words "comprise", "including", "having" and "contain" and variations of the words, for example "comprising" and "comprises" etc, mean "including but not limited to", and are not intended to (and do not) exclude other components.

PRIOR ART REFERENCES

1) L. B. Kreuzer, Journal of Applied Physics; 1971, Volume 42, Issue 7; p. 2934-2943 2) V. Ebert, T. Fernholz, and H. Pitz, T. Li, ed., Vol. 36 of OSA Trends in Optics and Photonics Series (Optical Society of America, 2000), paper SaB4.
3) V. Ebert, K.-U. Pleban, J. Wolfrum, Laser Applications to Chemical and Environmental Analysis, Technical Digest (Optical Society of America), pp 206-209 (1998)
4) J. U. White, Journal of the Optical Society of America, Vol. 32, Issue 5, pp. 285-288 (1942)
5) Hanst, P. L., Applied Spectroscopy, 1970, 24(2), 161-174.
6) P. G Wilkinson, H. L. Johnston, J. Chem. Phys. 18, 190 (1950).
7) R. W. Ditchburn, D. W. O Heddle, Proceedings. Mathematical, physical, and engineering sciences/the Royal Society; Volume 220, Issue 1140; p. 61-70, 1953.
8) WO2014/062419
9) US2017/0102315
10) US2015/0177131
11) US2012/0113426
12) US2018/0259452
13) US2017/0139182
14) EP1664691

The invention claimed is:

1. A method for controlling the flow of gas through a spectrometer, comprising:
  flowing a gas through a volume of the spectrometer, the volume being a volume through which light from a sample passes along a first path to reach a first detector and the gas being transparent to the light in a spectral region analyzed by the spectrometer;
  transmitting light from a light source along a second path through the gas to a second detector;
  detecting an intensity of the light from the light source at the second detector at one or more wavelengths of the light;
  comparing the detected intensity of the light to a respective setpoint corresponding to a desired transmittance of the gas in the volume of the spectrometer and generating at least one error signal based on the comparison; and
  adjusting a flow rate of the gas through the volume of the spectrometer based on the error signal.

2. The method according to claim 1, wherein the flow rate of the gas through the volume of the spectrometer is adjusted to minimize the difference between the detected intensity and setpoint.

3. The method according to claim 1, wherein the spectrometer is an optical emission spectrometer.

4. The method according to claim 1, wherein the second path is within the volume of the spectrometer.

5. The method according to claim 1, wherein the second path is within a measurement cell that is in fluid communication with the volume.

6. The method according to claim 5, wherein the measurement cell is in fluid communication with the volume via a closed loop fluid circuit.

7. The method according to claim 1, wherein the second path is a single pass though the gas.

8. The method according to claim 1, wherein the second path comprises multiple passes though the gas.

9. The method according to claim 1, wherein the light is VUV light or near-IR (NIR) light.

10. The method according to claim 1, wherein the intensity of the light is detected at a single wavelength or single band of wavelengths.

11. The method according to claim 1, wherein the intensity of the light is detected at two or more non-contiguous wavelengths or two or more non-contiguous bands of wavelengths.

12. The method according to claim 1, wherein the intensity of the light is detected at one or more absorption wavelengths of water and/or molecular oxygen.

13. The method according to claim 1, wherein the steps of comparing the detected intensity of the light to a setpoint corresponding, generating at least one error signal, and adjusting a flow rate of the gas are performed using proportional integral derivative (PID) control.

14. A method of optical emission spectrometry comprising, in a spectrometer, the following steps:
  providing a sample for analysis;
  exciting the sample to emit light;
  performing spectroscopic analysis of the emitted light using a spectrograph having a first detector to determine one or more elements present in the sample;
  wherein the emitted light passes along a first path through a volume to reach the first detector;
  flowing a substantially UV transparent gas through the volume; and
  controlling the flow of substantially UV transparent gas through the volume using the method according to claim 1.

15. An apparatus for controlling the flow of gas through a spectrometer, comprising:
  a housing containing a volume through which light from a sample can pass along a first path to reach a first detector;
  a gas supply for flowing a substantially UV transparent gas through the volume;
  a light source for transmitting light along a second path through the gas;
  a second detector for detecting an intensity of light from the light source transmitted along the second path through the gas at one or more wavelengths of the light; and
  a controller for comparing the detected intensity of the light to a respective setpoint corresponding to a desired transmittance of the gas in the volume, generating at least one error signal based on the comparison, and adjusting a flow rate of the gas through the volume of the spectrometer based on the at least one error signal.

16. The apparatus according to claim 15, wherein the controller is configured for adjusting the flow rate of the gas through the volume of the spectrometer to minimize the difference between the detected intensity and setpoint.

17. The apparatus according to claim 15, wherein the spectrometer is an optical emission spectrometer.

18. The apparatus according to claim 15, wherein the second path is within the volume of the spectrometer.

19. The apparatus according to claim 15, further comprising a measurement cell that is in fluid communication with the volume, wherein the second path is within the measurement cell.

20. The apparatus according to claim 19, wherein the measurement cell is in fluid communication with the volume via a closed loop fluid circuit.

21. The apparatus according to claim 15, wherein the second path is a single pass though the gas.

22. The apparatus according to claim 15, further comprising two mirrors for reflecting the light from the light source back and forth through the gas, wherein the second path comprises multiple passes though the gas.

23. The apparatus according to claim 15, wherein the light source is a vacuum ultraviolet (VUV) light source or a near-IR (NIR) light source.

24. The apparatus according to claim 15, wherein the second detector detects the intensity of the light at a single wavelength or single band of wavelengths from the light source.

25. The apparatus according to claim 15, wherein the second detector is adapted to detect the intensity of the light at one or more absorption wavelengths of water and/or molecular oxygen.

26. The apparatus according to claim 15, comprising two or more light sources for transmitting light respectively along two or more second paths through the gas, and two or more second detectors for respectively detecting an intensity of light transmitted along the respective second or more paths, wherein each light source emits light at different wavelengths or each second detector detects light at different wavelengths, wherein the intensity of light is detected at two or more non-contiguous wavelengths or two or more non-contiguous bands of wavelengths.

27. The apparatus according to claim 26, wherein the different wavelengths correspond to absorptions of gaseous water and gaseous oxygen respectively.

28. The apparatus according to claim 15, wherein the controller comprises a proportional integral derivative (PID) controller.

29. The apparatus according to claim 15, wherein the controller comprises a Single-Input Single-Output (SISO) controller or a Multiple-Input Single-Output (MISO) controller, which respectively convert a single error signal or multiple error signals into an output signal that is used to control the flow of gas.

30. The apparatus according to claim 29, wherein the output signal controls a flow valve and/or a pump for the gas.

31. An optical emission spectrometer, comprising: the apparatus for controlling the flow of gas of claim 15.

* * * * *